(12) United States Patent
Taga

(10) Patent No.: US 11,277,017 B2
(45) Date of Patent: Mar. 15, 2022

(54) CHARGER CONFIGURED TO CHARGE BATTERY PACK OF POWER TOOL

(71) Applicant: MAKITA CORPORATION, Anjo (JP)

(72) Inventor: Hideyuki Taga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 199 days.

(21) Appl. No.: 16/609,334

(22) PCT Filed: May 10, 2018

(86) PCT No.: PCT/JP2018/018200
§ 371 (c)(1),
(2) Date: Oct. 29, 2019

(87) PCT Pub. No.: WO2018/212075
PCT Pub. Date: Nov. 22, 2018

(65) Prior Publication Data
US 2020/0280200 A1    Sep. 3, 2020

(30) Foreign Application Priority Data
May 17, 2017   (JP) .............................. JP2017-098120

(51) Int. Cl.
*H02J 7/00* (2006.01)
*H02M 3/335* (2006.01)
*B25F 5/02* (2006.01)

(52) U.S. Cl.
CPC ....... *H02J 7/0045* (2013.01); *H02M 3/33569* (2013.01); *B25F 5/02* (2013.01); *H02J 2207/20* (2020.01)

(58) Field of Classification Search
USPC ......... 320/107, 108, 110, 111, 112, 113, 114
See application file for complete search history.

(56) References Cited

U.S. PATENT DOCUMENTS 6,066,938 A * 5/2000 Hyodo .................. H02J 7/0042
320/114
6,455,186 B1 * 9/2002 Moores, Jr. ....... H01M 10/6572
429/71
(Continued)

FOREIGN PATENT DOCUMENTS

JP       H11-288744 A      10/1999
JP       2006318820 A  *   11/2006
(Continued)

OTHER PUBLICATIONS

Jul. 3, 2018 Written Opinion of International Patent Application No. PCT/JP2018/018200.
(Continued)

*Primary Examiner* — Brian Ngo
(74) *Attorney, Agent, or Firm* — Oliff PLC

(57) ABSTRACT

A charger configured to charge a battery pack of a power tool, and the charger include: a housing having an intake port and an exhaust port; a battery interface included on the housing and configured to removably receive a battery pack, a charging circuit in the housing and configured to supply charging power to the battery pack attached to the battery interface; and a blower configured to introduce air from the intake port into the housing and discharge the air from the exhaust port to the outside of the housing. The intake port includes a plurality of intake holes formed in the housing, and the exhaust port includes a plurality of exhaust holes formed in the housing. Each inscribed circle of the plurality of intake holes is smaller than any of inscribed circles of the plurality of exhaust holes.

15 Claims, 9 Drawing Sheets

(56) References Cited

U.S. PATENT DOCUMENTS

| | | | | |
|---|---|---|---|---|
| 7,733,054 B2* | 6/2010 | Phillips | ............ | H01M 10/6566 |
| | | | | 320/107 |
| 7,843,165 B2* | 11/2010 | Sakaue | ................ | H01M 50/20 |
| | | | | 320/107 |
| 2010/0316900 A1* | 12/2010 | Sakakibara | ....... | H01M 10/6563 |
| | | | | 429/120 |
| 2011/0211312 A1 | 9/2011 | Senoh et al. | | |
| 2018/0191183 A1 | 7/2018 | Namiki | | |

FOREIGN PATENT DOCUMENTS

| | | | |
|---|---|---|---|
| JP | 2007-295677 A | | 11/2007 |
| JP | 2011-199259 A | | 10/2011 |
| JP | 2013-168596 A | | 8/2013 |
| JP | 2015184587 A | * | 10/2015 |
| JP | 2016-149841 A | | 8/2016 |
| WO | 2017/002519 A1 | | 1/2017 |

OTHER PUBLICATIONS

Jul. 3, 2018 Search Report issued in International Patent Application No. PCT/JP2018/018200.
Feb. 2, 2021 Office Action issued in Japanese Patent Application No. 2017-098120.
Mar. 30, 2021 Office Action issued in Japanese Patent Application No. 2017-098120.
Jan. 25, 2022 Office Action issued in Japanese Patent Application No. 2017-098120.

* cited by examiner

CHARGER CONFIGURED TO CHARGE BATTERY PACK OF POWER TOOL

TECHNICAL FIELD

The technology disclosed herein relates to a charger configured to charge a battery pack of a power tool.

BACKGROUND ART

Japanese Patent Application Publication No. 2016-149841 discloses a charger configured to charge a battery pack of a power tool. The charger includes a housing having an intake port and an exhaust port, a battery interface provided to the housing, a charging circuit configured to supply charging power to the battery pack attached to the battery interface, and a blower configured to introduce air from the intake port into the housing and discharge air from the exhaust port to an outside of the housing. According to such a configuration, since an inside of the housing is forcibly ventilated by the blower, a temperature rise of the charging circuit is reduced.

SUMMARY OF INVENTION

In a charger that ventilates its housing by a blower, dust may possibly intrude into the housing from its intake port. If the dust that has intruded into the housing is deposited on a substrate or electrical component(s) of a charging circuit, heat dissipation of the charging circuit is inhibited. In this case, there may be a case where a temperature of the charging circuit increases unexpectedly.

Accordingly, the present specification provides a technique that is capable of reducing buildup of dust in a charging circuit in a charger in which an inside of a housing is ventilated by a blower.

In accordance with one aspect of the present technology, a charger configured to charge a battery pack of a power tool is disclosed. The charger may comprise: a housing including an intake port and an exhaust port; a battery interface provided on the housing and configured to removably receive the battery pack; a charging circuit provided in the housing and configured to supply charging power to the battery pack attached to the battery interface; and a blower configured to introduce air from the intake port into the housing and discharge air from the exhaust port to outside of the housing. The intake port may include a plurality of intake holes formed in the housing, and the exhaust port may include a plurality of exhaust holes formed in the housing. Each inscribed circle of the plurality of intake holes may be smaller than any of inscribed circles of the plurality of exhaust holes.

In order to prevent dust from intruding through the intake port, it is preferable to make the intake holes of the intake port small. If each of the intake holes is made excessively small, however, a flow rate of air in the intake port decreases, and the inside of the housing cannot be sufficiently ventilated. In this regard, as a result of examining the intake holes of various shapes, it was identified that even when the intake holes have a same area as each other, an amount of dust passing through an intake hole with a smaller inscribed circle is less than those of other intake holes. This also applies to the exhaust holes of the exhaust port. That is, even when the exhaust holes have a same area as each other, an amount of dust passing through an exhaust hole with a smaller inscribed circle is less than those of other exhaust holes. Based on the above identifications, in the above-described charger, each inscribed circle of the plurality of intake holes is smaller than any of inscribed circles of the plurality of exhaust holes. According to such a configuration, the intrusion of dust from the intake port into the housing is reduced, and more dust that has intruded into the housing can be discharged from the exhaust port. As a result, the amount of dust remaining in the housing is reduced, and the buildup of dust in the charging circuit can be reduced.

DESCRIPTION OF EMBODIMENTS

Figure 1:
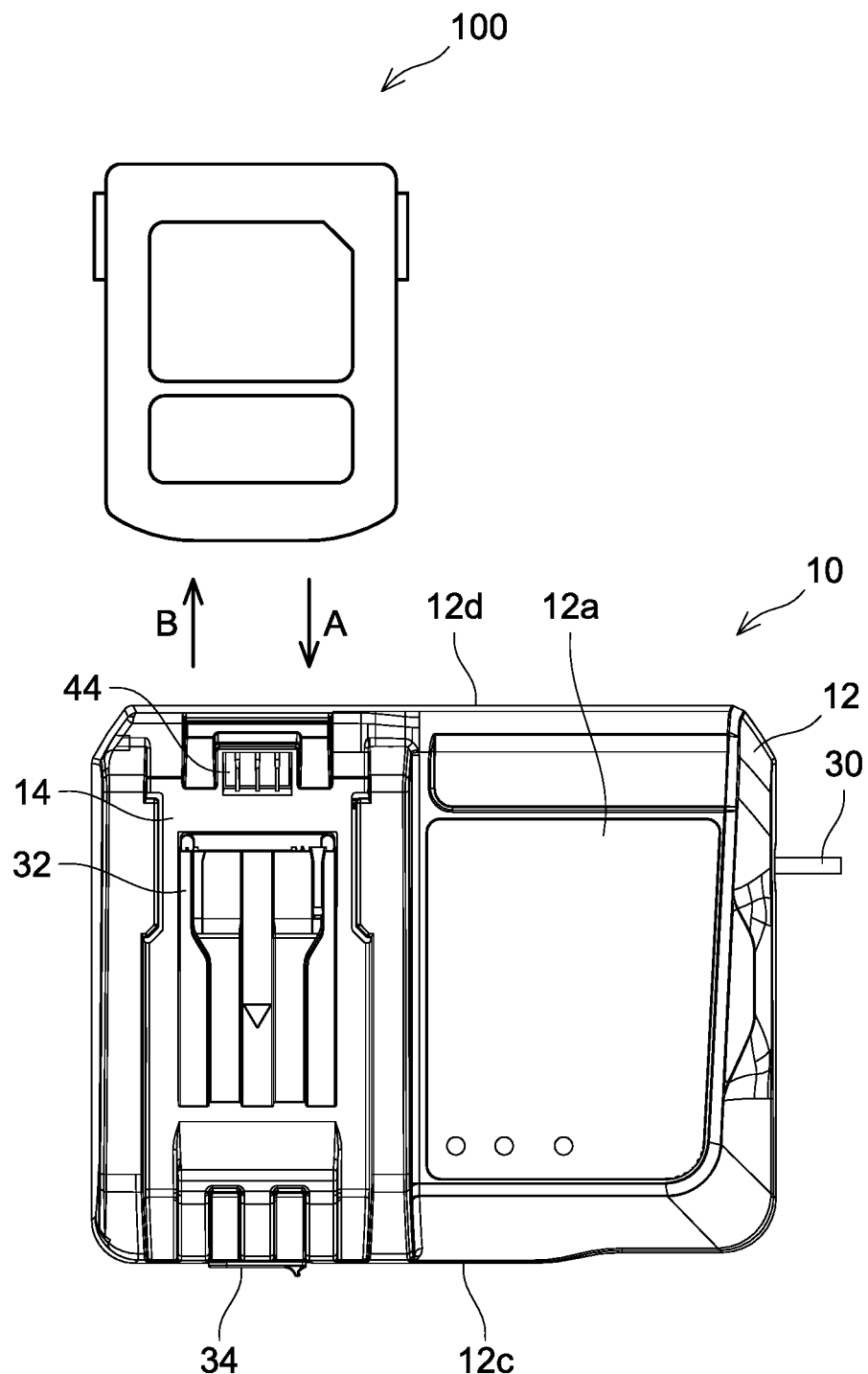
FIG. 1 is a plan view showing a charger 10 according to an embodiment with a battery pack 100.
Figure 2:
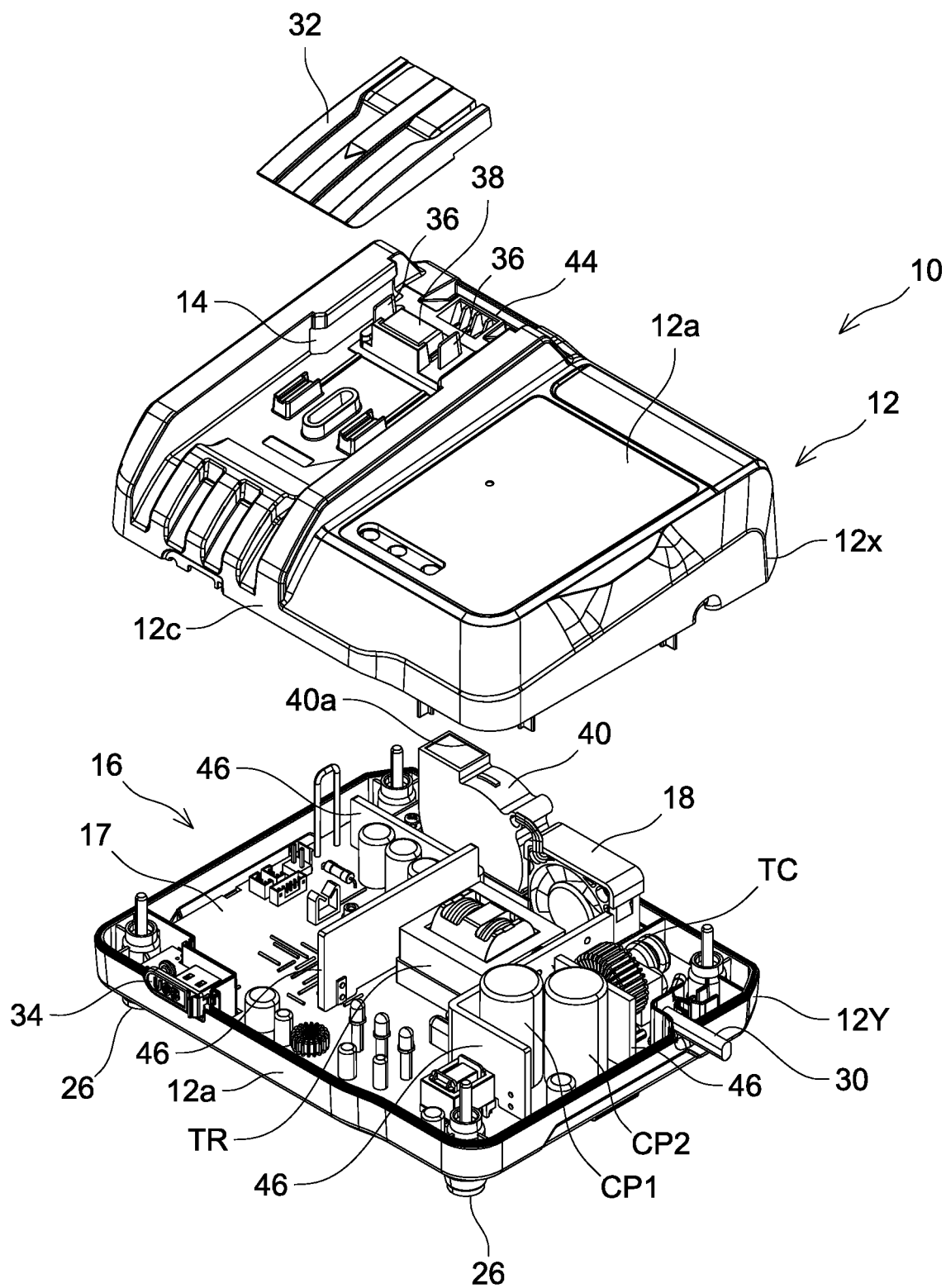
FIG. 2 is an exploded perspective view of the charger 10 according to the embodiment.
Figure 3:
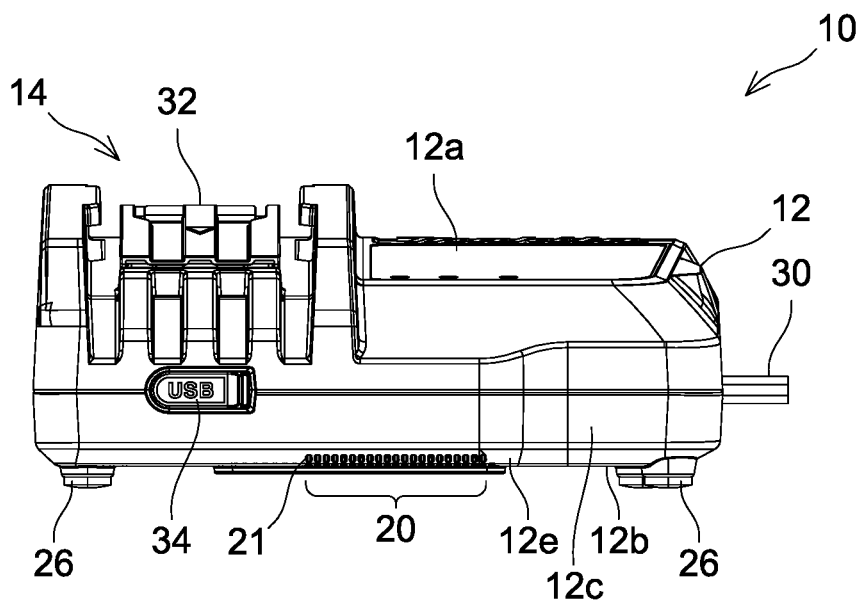
FIG. 3 is a front view of the charger 10 according to the embodiment.
Figure 4:
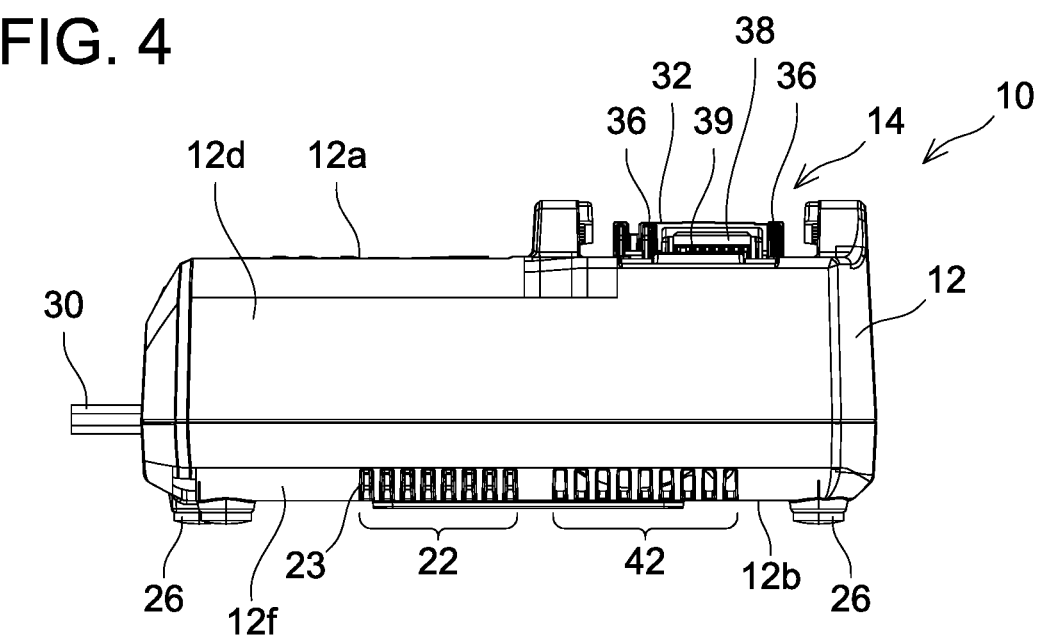
FIG. 4 is a rear view of the charger 10 according to the embodiment.

In some aspects, each area of a plurality of intake holes may be smaller than any of areas of a plurality of exhaust holes. According to such a configuration, the amount of dust intruding into a housing from the intake holes is reduced, and the amount of dust discharged from the exhaust holes to outside of the housing is increased. This can achieve reduction in the amount of dust remaining in the housing.

In some aspects, a number of the intake holes may be larger than a number of the exhaust holes. According to such a configuration, even when the area of each intake hole is small, an opening area of the intake port as a whole can be increased.

In some aspects, the plurality of intake holes is arranged in a matrix having a plurality of rows and columns. According to such a configuration, many intake holes can be formed in a compact area.

In some aspects, a distance from a blower to the exhaust port may be shorter than a distance from the blower to the intake port. In other words, the blower may be separated away from the intake port, thereby preventing the blower from directly suctioning dust outside the housing.

In some aspects, the housing may have an upper surface provided with a battery interface and a bottom surface opposite from the upper surface. In this case, each of the intake port and the exhaust port may be provided along a peripheral edge of the bottom surface. The intake port and the exhaust port provided on the bottom surface of the housing have less dust intruding therethrough as compared with, for example, the intake port and the exhaust port provided on the upper surface. Further, when the intake port and the exhaust port are provided along the peripheral edge of the bottom surface, it is possible to reduce a possibility that a flow of air drawn into the intake port and the flow of air discharged from the exhaust port are obstructed by a desk or a wall where the charger is disposed.

In the above aspect, a length of a range in which the intake port is provided along the peripheral edge of the bottom surface may be longer than a length of a range in which the exhaust port is provided along the peripheral edge of the bottom surface. According to such a configuration, even when an area of each intake hole is small, an opening area of the intake port as a whole can be increased.

In the aspects described above, the peripheral edge of the bottom surface of the housing may be curved toward the upper surface. In this case, the intake port and the exhaust port may be provided at least partially in the curved portion of the peripheral edge. According to such a configuration, a space is formed between the intake port/the exhaust port and a wall, thereby securing a flowing path of air drawn into the intake port and a flowing path of air discharged from the exhaust port. An increase in a flow rate of air in the intake port and the exhaust port promotes ventilation in the housing.

In some aspects, the housing may be configured attachable to a vertically extending wall. In this case, when the housing is attached to the wall, the bottom surface may be disposed along the wall, the intake port may be located along a lower edge of the bottom surface, and the exhaust port may be located along an upper edge of the bottom surface. According to such a configuration, since the flow of air by the blower is directed upward, the intrusion of dust into the housing is reduced by gravity acting on the dust.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved chargers.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

A charger 10 of an embodiment will be described with reference to the drawings. As shown in FIG. 1, the charger 10 is an electric device configured to charge a battery pack 100. The battery pack 100 is a power source for a power tool (not shown) and is detachably attached to the power tool. The charger 10 of the present embodiment is configured to charge the battery pack 100 in a state of being detached from the power tool. In other embodiments, however, the charger 10 may be configured to charge the battery pack 100 while it is attached to the power tool.

As shown in FIGS. 1-5, the charger 10 comprises a housing 12, a battery interface 14, a charging circuit 16, and a blower 18. The battery interface 14 is provided to the housing 12 and is configured to detachably receive the battery pack 100. The charging circuit 16 is provided in the housing 12 and is configured to supply charging power to the battery pack 100 attached to the battery interface 14. The blower 18 is configured to ventilate an inside of the housing 12 to reduce a temperature rise of the charging circuit 16. Although this is merely an example, the housing 12 in the present embodiment includes an upper portion 12X and a lower portion 12Y coupled to each other, and an internal space for accommodating the charging circuit 16 is formed between the upper portion 12X and the lower portion 12Y. The charging circuit 16 is connected to an external AC power supply via an electric cord 30.

The housing 12 includes an intake port 20 and an exhaust port 22. The intake port 20 has a plurality of intake holes 21 formed in the housing 12 and communicates the inside and outside of the housing 12. The exhaust port 22 has a plurality of exhaust holes 23 formed in the housing 12 and communicates the inside and outside of the housing 12. When the blower 18 operates, air is introduced into the housing 12 from the intake port 20, and the air is discharged out of the housing 12 from the exhaust port 22. As a result, the internal space of the housing 12 accommodating the charging circuit 16 is ventilated. Although this is merely an example, the intake port 20 and the exhaust port 22 are provided in the lower portion 12Y of the housing 12 and are located along peripheral edges 12e and 12f of a bottom surface 12b of the housing 12. The peripheral edge 12e of the bottom surface 12b where the intake port 20 is located is located at a boundary between a front surface 12c and the bottom surface 12b of the housing 12, and the peripheral edge 12f of the bottom surface 12b where the exhaust port 22 is located is located at a boundary between a back surface 12d and the bottom surface 12b of the housing 12. The peripheral edges 12e and 12f of the bottom surface 12b are curved toward the front surface 12c, and the intake port 20 and the exhaust port 22 are located at curved portions of the peripheral edges 12e and 12f, respectively.

The battery interface 14 is located on the upper surface 12a of housing 12. The battery interface 14 is configured to slidably receive the battery pack 100 along directions A and B in FIG. 1. The battery interface 14 includes a pair of charging output terminals 36 and a communication connector 38. The communication connector 38 has a plurality of communication terminals 39 (see FIG. 4). The pair of charging output terminals 36 and the plurality of communication terminals 39 are electrically connected to the battery pack 100 attached to the battery interface 14. The battery interface 14 includes a movable cover 32 configured to cover the pair of charging output terminals 36 and the communication connector 38. In the present embodiment, the charger 10 supplies charging power to the battery pack 100 in a wired manner, but in another embodiment, the charger 10 may supply the charging power to the battery pack 100 in a wireless manner. A USB port 34 for outputting DC power is provided on the front surface 12c of the housing 12. The USB port 34 is configured to be connected to an electronic device such as a smartphone, and is configured to supply charging power and operating power to the connected electronic device.

The charger 10 includes a second blower 40 for cooling the battery pack 100 during charging. The housing 12 includes a second intake port 42 and a second exhaust port 44 for the second blower 40. The second intake port 42 is located along the peripheral edge 12f of the bottom surface 12b of the housing 12, and the second exhaust port 44 is located in the battery interface 14. The second exhaust port 44 is coupled to the battery pack 100 attached to the battery interface 14. When the second blower 40 operates, air introduced from the second intake port 42 is discharged from an exhaust opening 40a of the second blower 40. The exhaust opening 40a of the second blower 40 is connected to the second exhaust port 44, and air from the second blower 40 is supplied to the battery pack 100. As a result, the battery pack 100 during charging is cooled.

Figure 5:
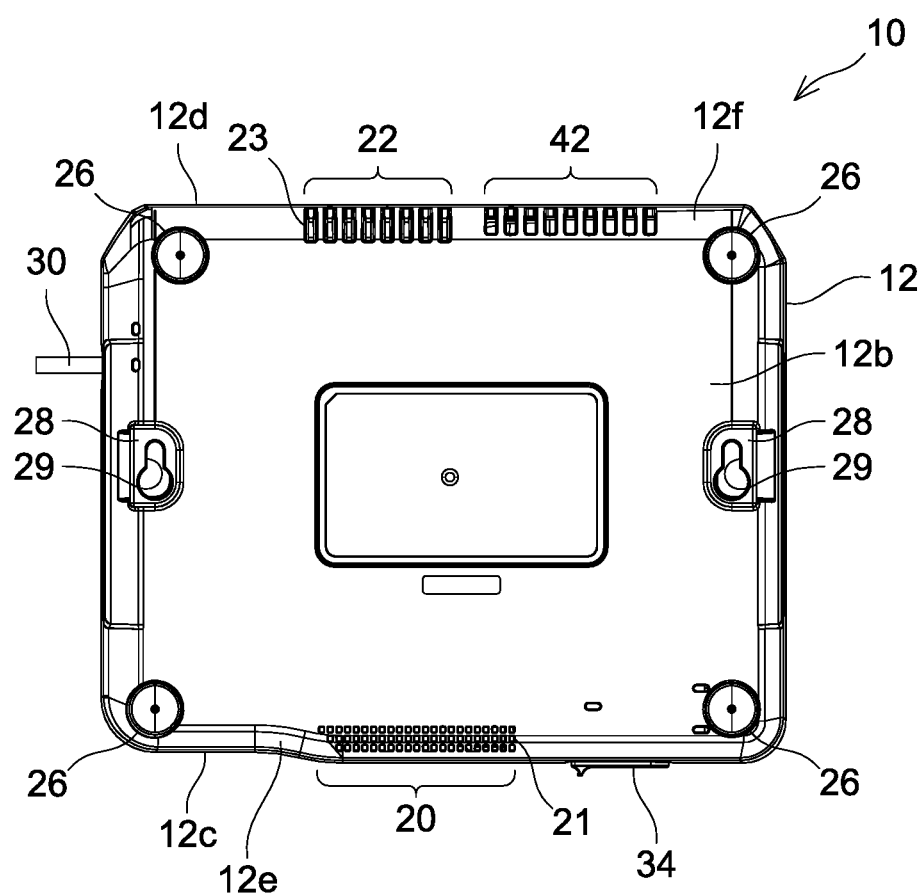
FIG. 5 is a bottom view of the charger 10 according to the embodiment.
Figure 6:
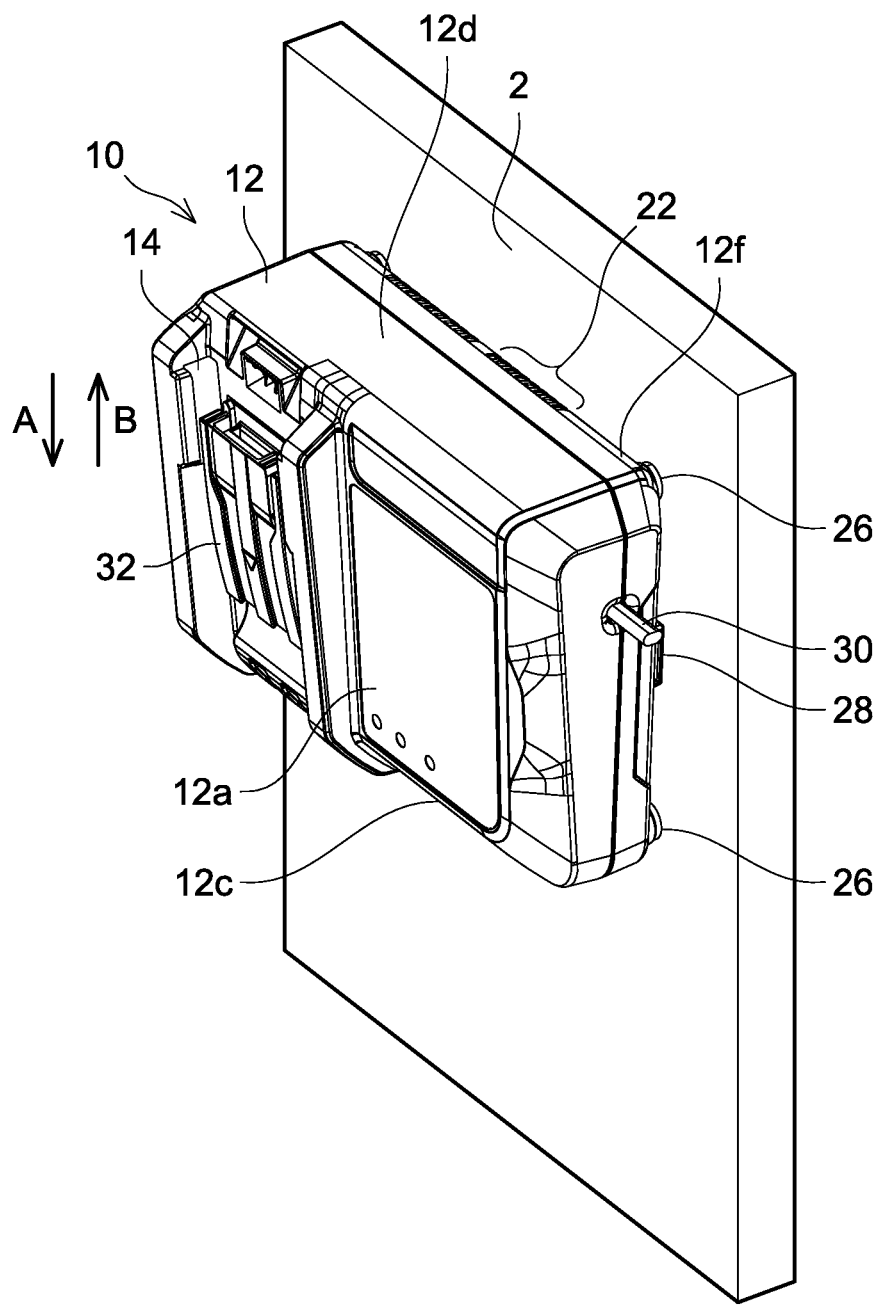
FIG. 6 shows the charger 10 mounted on a wall 2.

As shown in FIG. 5, the housing 12 has a plurality of feet 26. The plurality of feet 26 is provided on the bottom surface 12b of the housing 12. The plurality of feet 26 contacts a surface of a desk or shelf to support the charger 10 when the charger 10 is placed, for example, on the desk or shelf. The housing 12 further includes a plurality of wall attachments 28. The plurality of wall attachments 28 is provided on the bottom surface 12b of the housing 12. Thus, as shown in FIG. 6, the housing 12 can be attached to a vertically extending wall 2 in a predetermined direction. When the housing 12 is attached to the wall 2, the bottom surface 12b of the housing 12 is positioned along the wall 2. Further, the intake port 20 is located along the lower edge 12e of the bottom surface 12b, and the exhaust port 22 is located along the upper edge 12f of the bottom surface 12b. That is, the exhaust port 22 is positioned above the intake port 20 in a vertical direction. The sliding directions A and B of the battery pack 100 in the battery interface 14 are parallel to the vertical direction. The term "parallel" herein is not limited to a state of being completely parallel, and includes a state of forming an angle of less than 15 degrees. Although this is merely an example, each wall attachment 28 in the present embodiment has an engagement hole 29 that engages with a screw or hook secured to the wall 2. A position, number and structure of the wall attachments 28 are not particularly limited. The wall attachments 28 may simply need to be configured to attach the housing 12 to the vertically extending wall 2 in a predetermined direction.

Next, a configuration of the charging circuit 16 will be described with reference to FIGS. 7 and 8. The charging circuit 16 includes a circuit board 17 and a plurality of electronic components (for example, a transformer TR) provided on the circuit board 17. The configuration of the charging circuit 16 will be described in detail below, but the configuration of the charging circuit 16 is not limited thereto. The configuration of the charging circuit 16 can be modified as appropriate. As shown in FIG. 8, the charging circuit 16 includes a voltage doubling rectifier circuit 52, a switching circuit 54, the transformer TR, a secondary rectifier circuit 56, a gate driver 58, a photocoupler 60, and a controller 62. The voltage doubling rectifier circuit 52 has a diode bridge DB, a first capacitor CP1, and a second capacitor CP2, and is configured to convert AC power into DC power. AC power is supplied to the voltage doubling rectifier circuit 52 from outside through the electric cord 30. The voltage doubling rectifier circuit 52 converts the supplied AC power into DC power and outputs the DC power to the switching circuit 54. A toroidal coil TC configured to remove a common-mode noise current is provided between the electric cord 30 and the voltage doubling rectifier circuit 52.

The switching circuit 54 is provided between the voltage doubling rectifier circuit 52 and the transformer TR, and converts the DC power output from the voltage doubling rectifier circuit 52 into AC power that is supplied to the transformer TR. By way of example, the switching circuit 54 includes a first switching element SW1, a second switching element SW2, a third capacitor CP3, and a fourth capacitor CP4. The first switching element SW1 and the second switching element SW2 are controlled by the gate driver 58. Typically, the gate driver 58 alternately turns on the first switching element SW1 and the second switching element SW2, by which AC power is input to the transformer TR. At this occasion, the gate driver 58 can adjust a magnitude of the AC power supplied to the transformer TR by changing respective duty ratios (turn-on time per cycle) of the first switching element SW1 and the second switching element SW2. Each of the first switching element SW1 and the second switching element SW2 is not particularly limited, but is a power semiconductor element such as a Metal-Oxide-Semiconductor Field-Effect Transistor (MOSFET).

The AC power supplied to the transformer TR is reduced in voltage by the transformer TR and supplied to the secondary rectifier circuit 56. The secondary rectifier circuit 56 includes a diode DI and a fifth capacitor CP5, and converts the AC power supplied from the transformer TR into DC power. The secondary rectifier circuit 56 is connected to the pair of charging output terminals 36, and the DC power from the secondary rectifier circuit 56 is supplied to the battery pack 100 as charging power. The charging power supplied to the battery pack 100 is monitored by the controller 62. For example, the controller 62 is configured to detect the charging current supplied to the battery pack 100, and output a control signal corresponding to the detected charging current to the gate driver 58. The control signal is transmitted from the controller 62 to the gate driver 58 via the photocoupler 60. The gate driver 58 controls the respective duty ratios of the first switching element SW1 and the second switching element SW2 in accordance with the received control signal. As a result, the charging current supplied to the battery pack 100 is feedback-controlled. The controller 62 is further connected to the plurality of communication terminals 39.

As shown in FIG. 8, the battery pack 100 includes a plurality of secondary battery cells 104, a pair of battery power terminals 106, a battery controller 108, a temperature sensor 110, and a plurality of battery communication terminals 112. Each secondary battery cell 104 is, but is not limited to, a lithium ion cell. The plurality of secondary battery cells 104 is connected to the pair of battery power terminals 106. The pair of battery power terminals 106 is connected to the pair of charging output terminals 36 of the charger 10 when the battery pack 100 is attached to the charger 10. The battery controller 108 can detect the voltages of the plurality of secondary battery cells 104. The temperature sensor 110 detects a temperature of the secondary battery cells 104 of the plurality of secondary battery cells 104. The battery controller 108 and the temperature sensor 110 are connected to the plurality of battery communication terminals 112. The plurality of battery communication terminals 112 are respectively connected to the plurality of communication terminals 39 of the charger 10 when the battery pack 100 is attached to the charger 10. Thus, the controller 62 of the charger 10 can control charging operation of the battery pack 100 in accordance with the voltages and temperature of the plurality of secondary battery cells 104 of the battery pack 100.

In the charger 10 of the present embodiment, the housing 12 is configured attachable to the vertically extending wall 2. The charging circuit 16 in the housing 12 generates heat while the charger 10 is charging the battery pack 100. When the charging circuit 16 generates heat, air around the charging circuit 16 is warmed and moves upward. As a result, an upward air flow is formed in the housing 12 by thermal convection. On the other hand, the housing 12 is provided with the intake port 20 and the exhaust port 22, and the exhaust port 22 is positioned above the intake port 20. Due to this, an upward air flow is formed in the housing 12 by the blower 18. The flow of air by the blower 18 generally coincides with the flow of air by thermal convection, thus the air warmed by the charging circuit 16 is smoothly discharged out of the housing 12. As a result, the inside of the housing 12 is sufficiently ventilated, and the temperature rise of the charging circuit 16 is reduced.

Figure 7:
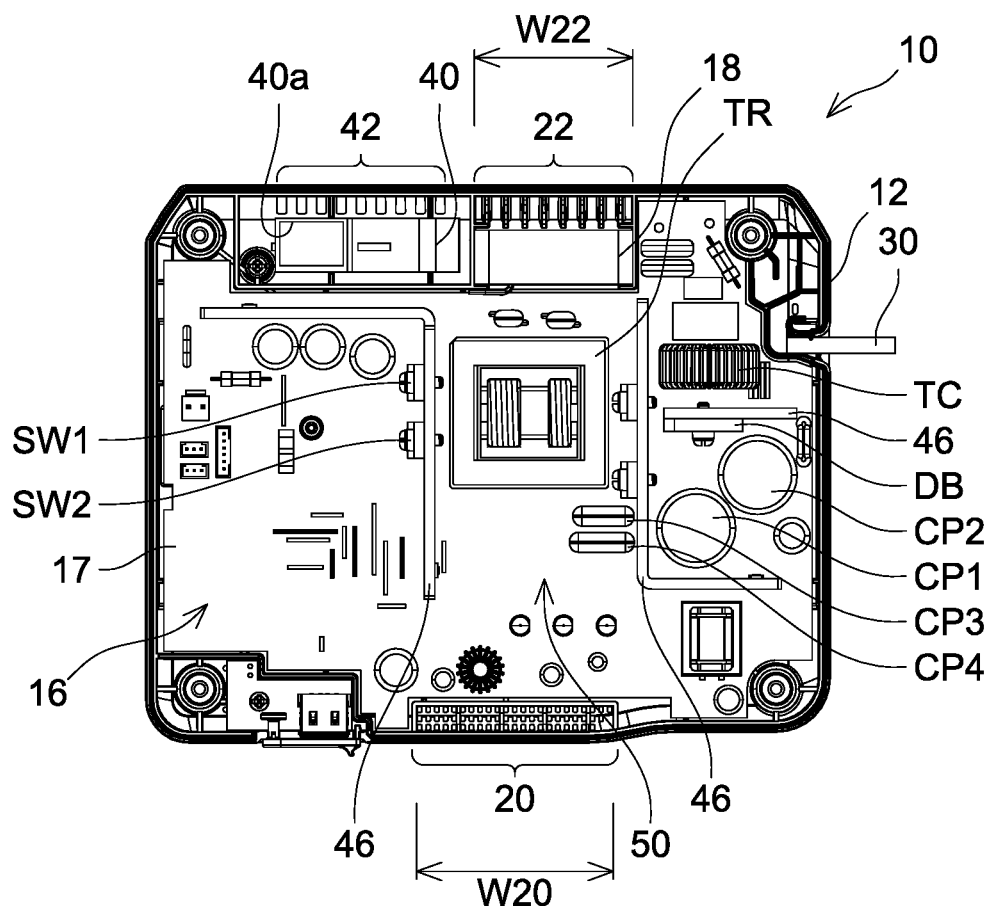
FIG. 7 is a plan view illustrating an internal structure of the charger 10.
Figure 8:
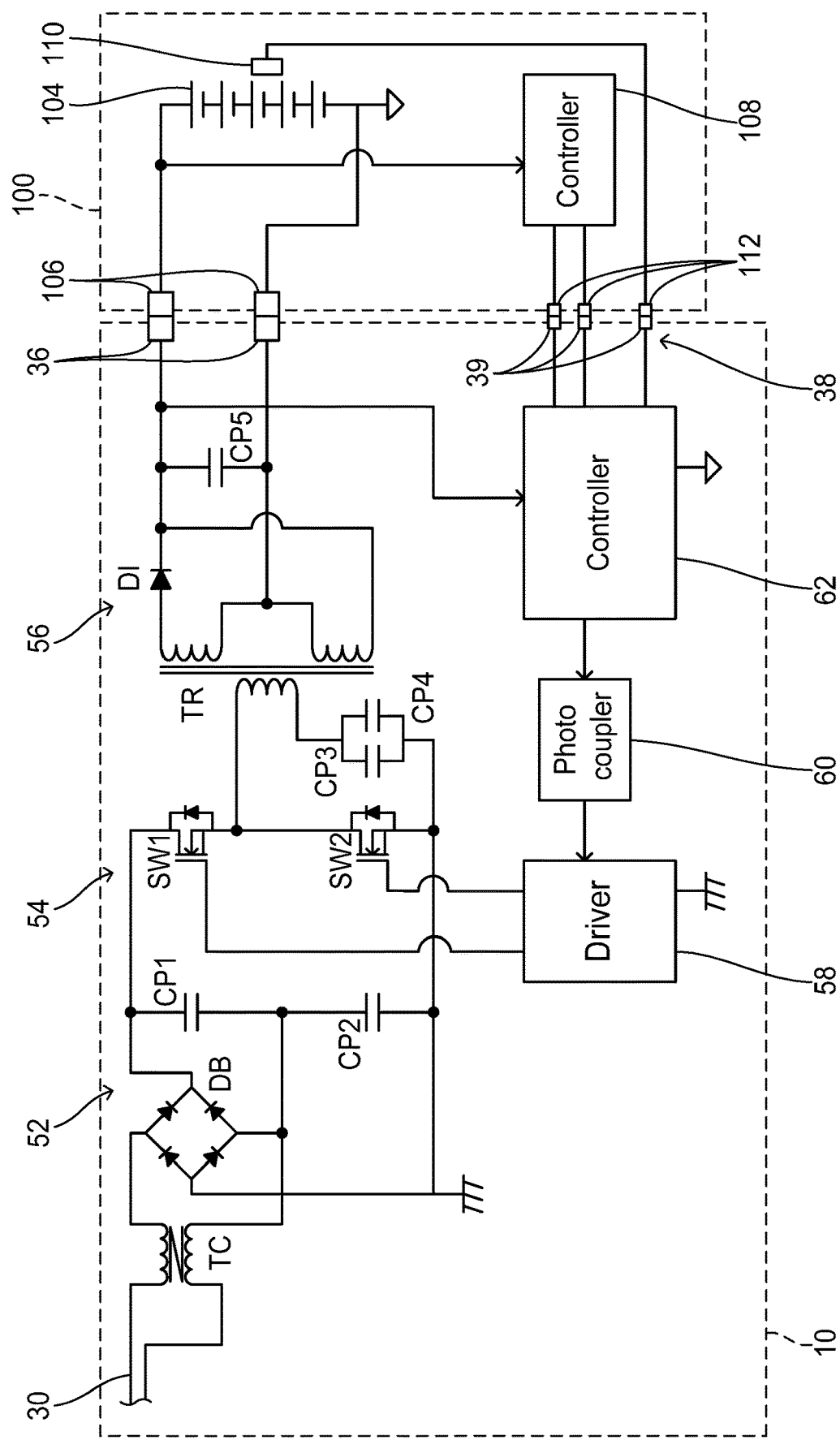
FIG. 8 is a circuit diagram of the charger 10 and the battery pack 100.

In the charger 10 of the present embodiment, as shown in FIG. 7, the blower 18 is disposed adjacent to the exhaust port 22. In this manner, when the blower 18 is disposed closer to the exhaust port 22 than to the intake port 20, the air flow in the housing 12 is less likely to be disturbed, and the housing 12 can be appropriately ventilated. In addition to the blower 18 adjacent to the exhaust port 22, another blower adjacent to the intake port 20 may be further provided to the charger 10.

In the charger 10 of the present embodiment, the intake port 20 and the exhaust port 22 are provided along the peripheral edges 12e and 12f of the bottom surface 12b of the housing 12. A length W20 of a range where the intake port 20 is provided along the peripheral edge 12e of the bottom surface 12b is longer than a length W22 of a range where the exhaust port 22 is provided along the peripheral edge 12f of the bottom surface 12b (see FIG. 7). According to such a configuration, even if an area of each intake hole is small, the opening area of the intake port as a whole can be increased. Further, by increasing the length W20 of the range where the intake port 20 is provided, it is possible to reduce a temperature rise of many electronic components arranged in a wide area in the housing 12. In regards to this, the length W22 of the range where the exhaust port 22 is provided may be substantially same as or correspond to a size of the blower 18, by which the air from the blower 18 is efficiently discharged from the exhaust port 22 and the size of the charger 10 can be reduced.

In the charger 10 of the present embodiment, when the housing 12 is attached to the wall 2, the bottom surface 12b of the housing 12 is disposed along the wall 2, the intake port 20 is located along the lower edge 12e of the bottom surface 12b, and the exhaust port 22 is located along the upper edge 12f of the bottom surface 12b. Thus, the intake port 20 is positioned below any of the electronic components of the charging circuit 16 that generate heat, and the exhaust port 22 is positioned above any of the electronic components of the charging circuit 16 that generate heat. With such a configuration, an upward air flow is formed over substantially an entire interior of the housing, and the interior of the housing is thereby effectively ventilated. Further, since the intake port 20 and the exhaust port 22 are not fully covered by the wall 2, the flows of air through the intake port 20 and the exhaust port 22 are less inhibited by the wall 2.

In the charger 10 of the present embodiment, the lower edge 12e of the bottom surface 12b of the housing 12 is curved in an orientation separating away from the wall 2, and at least a part of the intake port 20 is provided at the curved portion of the lower edge 12e. Similarly, the upper edge 12f of the bottom surface 12b of the housing 12 is curved in the orientation separating away from the wall 2, and at least a part of the exhaust port 22 is provided at the curved portion of the upper edge 12f. According to such a configuration, a space is formed between the intake port 20 and the wall 2 and between the exhaust port 22 and the wall 2, and an air flow path is secured in vicinity of each of the intake port 20 and the exhaust port 22. The increase in a flow rate of the air through the intake port 20 and the exhaust port 22 further promotes the ventilation in the housing 12.

Figure 9A:
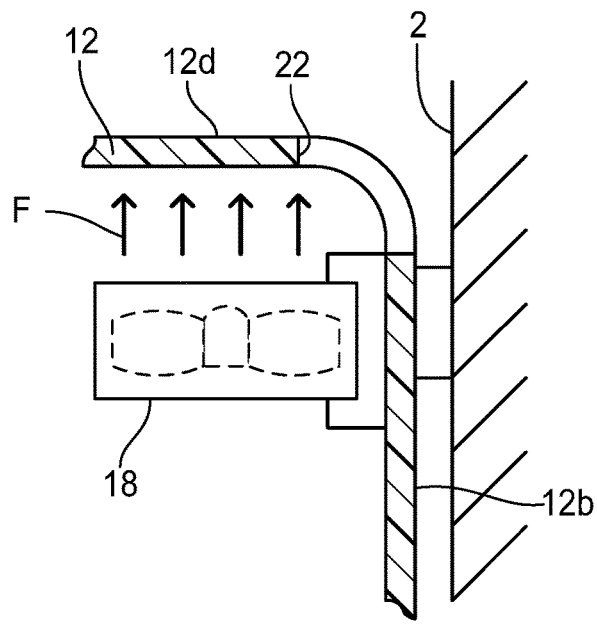
FIG. 9(A) shows an arrangement of a blower 18 in the embodiment.
Figure 9B:
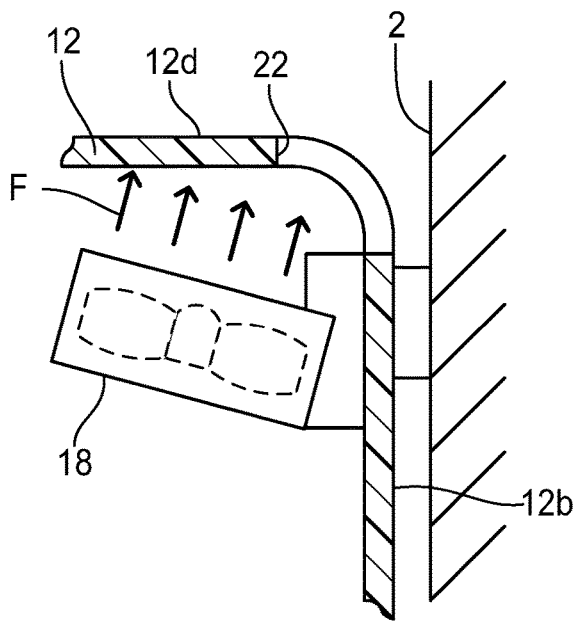
FIG. 9(B) shows an arrangement of a blower 18 tilted in another embodiment.

In the charger 10 of the present embodiment, as shown in FIG. 9(A), the blower 18 is arranged so as to blow air toward the exhaust port 22. A blowing direction F of the blower 18 is substantially parallel to the bottom surface 12b of the housing 12 and becomes also parallel to the wall 2 when the housing 12 is attached to the wall 2. However, as another embodiment, as shown in FIG. 9(B), when the housing 12 is attached to the wall 2, the blowing direction F of the blower 18 may be angled with respect to the wall 2. In this case, the blowing direction F of the blower 18 may not be parallel to the wall 2 but may have an angle of less than 90 degrees with respect to the wall 2. When the blower 18 is angled in this manner, an amount of exhaust air through the exhaust port 22 is increased, and the inside of the housing 12 can be more ventilated.

In the charger 10 of the present embodiment, as shown in FIG. 6, when the housing 12 is attached to the wall 2, sliding directions A and B of the battery pack 100 in the battery interface 14 become parallel to the vertical direction. With such an arrangement, a longitudinal direction of the battery interface 14 substantially coincides with the direction of air flow within the housing 12, thus the air flow within the housing 12 is prevented from being obstructed by the battery interface 14 and/or associated components.

In the charger 10 of the present embodiment, as shown in FIG. 7, the charging circuit 16 includes the transformer TR, and the blower 18 is located between the transformer TR and the exhaust port 22. The transformer TR is an electronic component that generates a particularly large amount of heat among the electronic components of the charging circuit 16. When the blower 18 is positioned between the transformer TR and the exhaust port 22, the heat generated by the transformer TR can be effectively discharged from the exhaust port 22, and the temperature rise of the charging circuit 16 can be effectively reduced.

As shown in FIG. 7, the charger 10 of the present embodiment includes a plurality of heat dissipating plates 46. The plurality of heat dissipating plates 46 is located within the housing 12 and stands on the circuit board 17 of the charging circuit 16. The plurality of heat dissipating plates 46 includes a pair of heat dissipating plates 46 opposed to each other with the transformer TR interposed therebetween. Each of the pair of heat dissipating plates 46 extends in parallel with a direction from the intake port 20 toward the exhaust port 22. According to such a configuration, when the housing 12 is attached to the wall 2, each of the pair of heat dissipating plates 46 is parallel along the vertical direction. Due to this, an air flow path 50 extending from the intake port 20 to the exhaust port 22 is formed so as to pass between the pair of heat dissipating plates 46, and the transformer TR disposed in the flow path 50 is effectively cooled. The first switching element SW1 and the second switching element SW2 of the charging circuit 16 are disposed on one of the heat dissipating plates 46. As described above, the first switching element SW1 and the second switching element SW2 are power semiconductor elements, and are electronic components that generate relatively large amounts of heat. Not being limited to the first switching element SW1 and the second switching element SW2, but also when another type of electronic component such as a power semiconductor element is arranged on the heat radiating plate(s) 46, the temperature rise of that component can also be reduced.

Figure 10A:
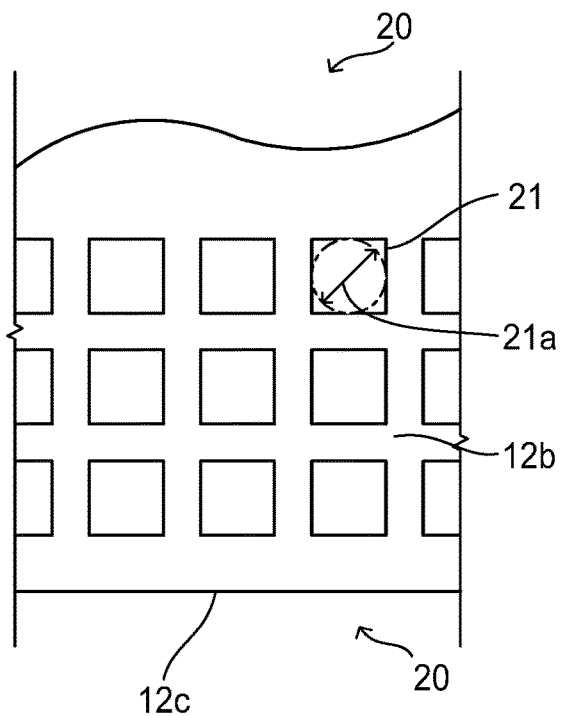
FIG. 10(A) shows a plurality of intake holes 21 of an intake port 20, and FIG. 10 (B) shows a plurality of exhaust holes 23 of an exhaust port 22.
Figure 10B:
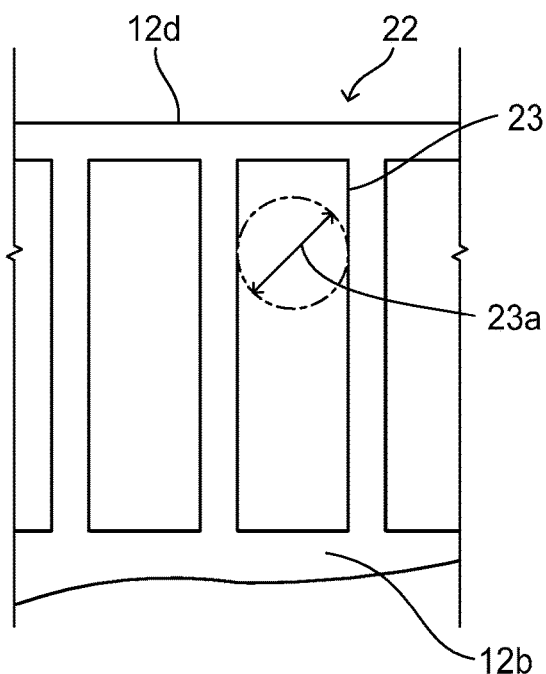

In the charger 10 of the present embodiment, as shown in FIGS. 10(A) and (B), the shape of each intake hole 21 in the intake port 20 and the shape of each exhaust hole 23 in the exhaust port 22 are different from each other. In particular, an inscribed circle 21a of the intake hole 21 is smaller than an inscribed circle 23a of the exhaust hole 23. This is due to the following reasons. As the blower 18 ventilates the housing 12, dust intrudes into the housing 12 through the intake port 20. In order to prevent the dust from intruding into the intake port 20, it is preferable to reduce a size of each intake hole 21 of the intake port 20. If the size of each intake hole 21 is made too small, however, the flow rate of air in the intake port 20 decreases, and the inside of the housing 12 cannot be sufficiently ventilated.

In regard to the above, as a result of examining the intake holes 21 having various shapes, it was identified that the intake hole 21 having a smaller inscribed circle 21a has a smaller amount of dust passing therethrough than the other intake holes 21 even though the respective areas of the intake holes are same as each other. This also applies to the exhaust holes 23 of the exhaust port 22. That is, even though the areas of the exhaust holes 23 are same as each other, the exhaust hole 23 having a smaller inscribed circle 23a has a smaller amount of dust passing therethrough than the other exhaust holes 23. Based on the above identifications, in the charger 10 of the present embodiment, each inscribed circle 21a of the plurality of intake holes 21 is designed to be smaller than any of inscribed circles 23a of the plurality of exhaust holes 23. According to such a configuration, intrusion of dust through the intake port 20 into the housing 12 is reduced, and more of the dust that has intruded into the housing 12 can be discharged through the exhaust port 22. As a result, the amount of dust remaining in the housing 12 is reduced, and problems such as dust buildup in the charging circuit 16, for example, are reduced.

In the charger 10 of the present embodiment, the area of each intake hole 21 of the plurality of intake holes 21 is smaller than any of areas of the plurality of exhaust holes 23. According to such a configuration, the amount of dust intruding into the housing 12 from the intake holes 21 is reduced, and the amount of dust discharged to the outside of the housing 12 through the exhaust holes 23 is increased. This allows for reduction of the amount of dust remaining in the housing. Additionally or alternatively, a number of the intake holes 21 may be greater than a number of the exhaust holes 23. According to such a configuration, even when the area of each intake hole 21 is small, the opening area of the intake port 20 as a whole can be increased. In this case, the plurality of intake holes 21 may be arranged in a matrix having a plurality of rows and columns. According to such a configuration, many intake holes 21 can be formed in a compact range.

Figure 11:
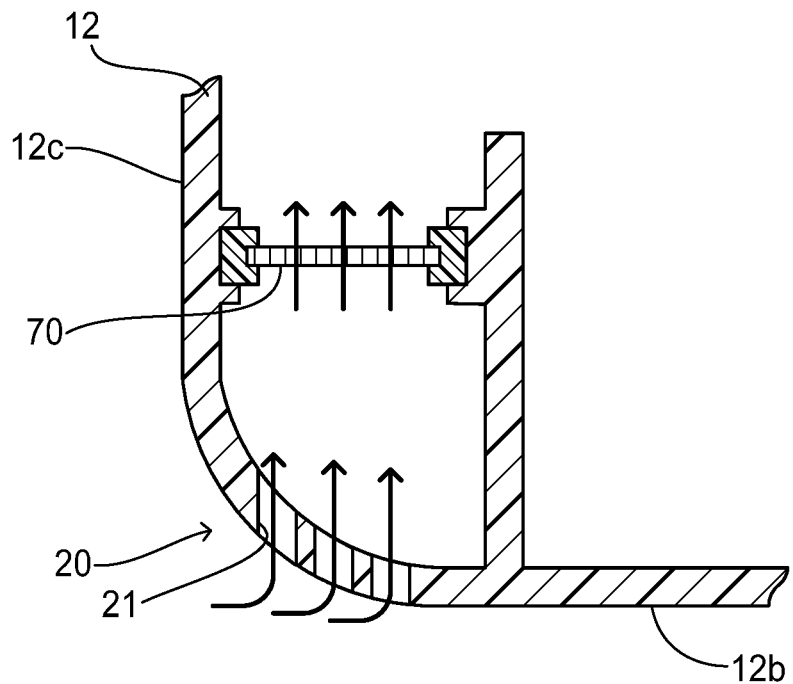
FIG. 11 illustrates an embodiment in which a filter 70 is provided to the intake port 20.
Figure 12:
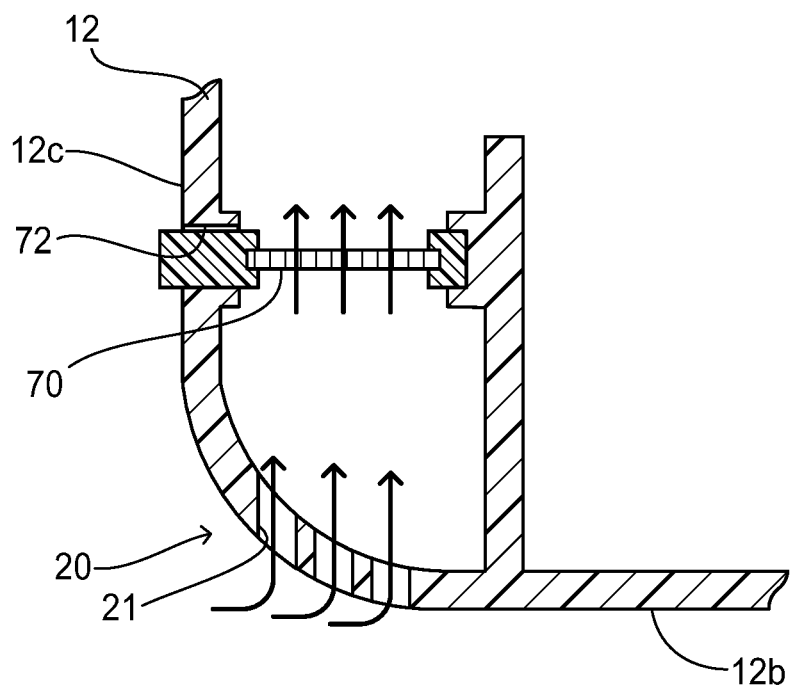
FIG. 12 shows an embodiment in which an opening 72 for the filter 70 is provided in a housing.

As shown in FIG. 11, the intake port 20 of the housing 12 may be provided with a filter 70 for capturing dust. The filter 70 is not particularly limited, but may be a porous filter such as, for example, a paper filter, a woven filter, a nonwoven filter, a metal filter, or a sponge. Thus, even when the respective intake holes 21 are made relatively large, the intrusion of dust can be reduced. In this case, the intake hole(s) 21 may be made larger than the exhaust hole(s) 23. As shown in FIG. 12, the housing 12 may be provided with an opening 72 for attaching and detaching the filter 70. With this configuration, the filter 70 can be easily cleaned and replaced. Here, the filter 70 and associated structures (for example, the opening 72) can be similarly employed in various chargers irrespective of whether or not the housing 12 is attachable to the wall 2.

The invention claimed is:

1. A charger configured to charge a battery pack of a power tool, the charger comprising:
a housing having a first intake port, a first exhaust port, a second intake port and a second exhaust port, the first exhaust port and the second intake port being side by side along a first wall of the housing;
a battery interface on the housing and configured to removably receive the battery pack, the second exhaust port being in the battery interface;
a charging circuit in the housing and configured to supply charging power to the battery pack when the battery pack is attached to the battery interface;
a first blower configured to introduce a first air from the first intake port into the housing and discharge the first air from the first exhaust port to outside of the housing after the first air passes by the charging circuit, and
a second blower side by side with the first blower along the first wall of the housing and configured to introduce a second air from the second intake port into the housing and discharge the second air from the second exhaust port at the battery interface,
wherein the first intake port includes a plurality of intake holes in the housing, and the first exhaust port includes a plurality of exhaust holes in the housing.

2. The charger according to claim 1, wherein an area of each of the plurality of intake holes is smaller than an area of each of the plurality of exhaust holes.

3. The charger according to claim 1, wherein a number of the plurality of intake holes is larger than a number of the plurality of exhaust holes.

4. The charger according to claim 1, wherein the plurality of intake holes is arranged in a matrix having a plurality of rows and columns.

5. The charger according claim 1, wherein a distance from the first blower to the first exhaust port is shorter than a distance from the first blower to the first intake port.

6. The charger according to claim 1, wherein
the housing has a upper surface bearing the battery interface and a bottom surface opposite from the upper surface, and the first intake port and the first exhaust port are along a peripheral edge of the bottom surface.

7. The charger according to claim 6, wherein
a length of the first intake port along the peripheral edge of the bottom surface is longer than a length of a the exhaust port along the peripheral edge of the bottom surface.

8. The charger according to claim 6, wherein
the peripheral edge of the bottom surface of the housing is curved toward the upper surface, and the first intake port and the first exhaust port are at least partially in a curved portion of the peripheral edge.

9. The charger according to claim 6, wherein
the housing is configured:
to be attachable to a vertically extending wall, and
such that, when the housing is attached onto the wall, the bottom surface is along the wall, the first intake port is along a lower edge of the bottom surface, and the first exhaust port is along an upper edge of the bottom surface.

10. The charger according to according to claim 1, wherein
an area of each of the plurality of intake holes is smaller than an area of each of the plurality of exhaust holes,
a number of the plurality of intake holes is larger than a number of the plurality of exhaust holes,
the plurality of intake holes is arranged in a matrix having a plurality of rows and columns, and
a distance from the first blower to the first exhaust port is shorter than a distance from the first blower to the first intake port.

11. The charger according to claim 10, wherein
the housing has a upper surface bearing the battery interface and a bottom surface opposite from the upper surface, and the first intake port and the first exhaust port are along a peripheral edge of the bottom surface,
a length of the first intake port along the peripheral edge of the bottom surface is longer than a length of the first exhaust port along the peripheral edge of the bottom surface, and
the peripheral edge of the bottom surface of the housing is curved toward the upper surface, and the first intake port and the first exhaust port are at least partially in a curved portion of the peripheral edge.

12. The charger according to claim 11, wherein
the housing is configured:
to be attachable to a vertically extending wall, and
such that, when the housing is attached onto the wall, the bottom surface along the wall, the first intake port is along a lower edge of the bottom surface, and the first exhaust port is along an upper edge of the bottom surface.

13. The charger according to claim 1, wherein the first exhaust port and the second intake port are along a side of a peripheral edge of the first wall.

14. The charger according to claim 1, wherein
the housing comprises a upper wall bearing the battery interface and a bottom wall opposite from the upper wall,
the first wall extending between the upper wall and the bottom wall, and
the first exhaust port and the second intake port are located on a boundary between the first wall and the bottom wall.

15. The charger according to claim 1, wherein the second blower comprises an exhaust opening connected to the second exhaust port.

\* \* \* \* \*